March 6, 1934.     H. A. TOULMIN, JR     1,949,699
BIFOCAL LENS
Filed July 13, 1931
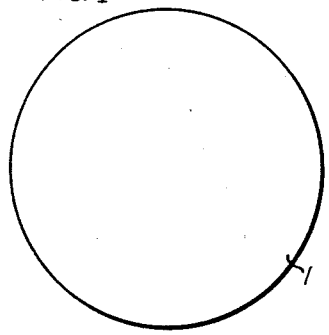
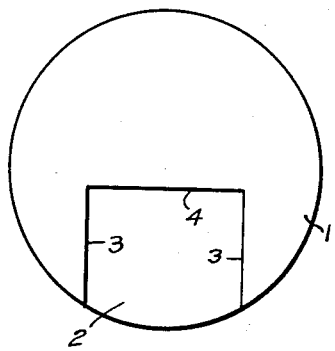
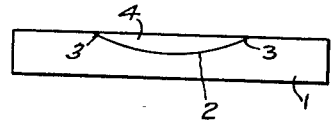
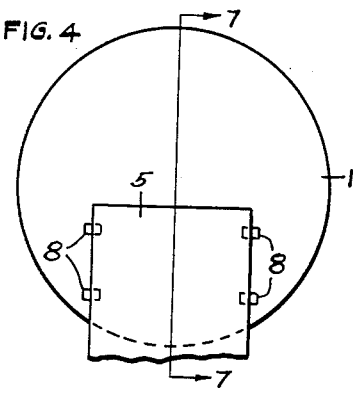
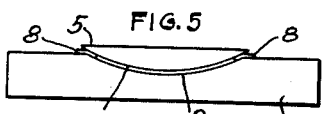
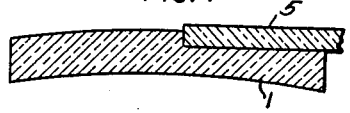
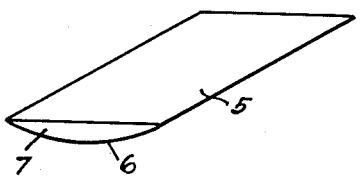
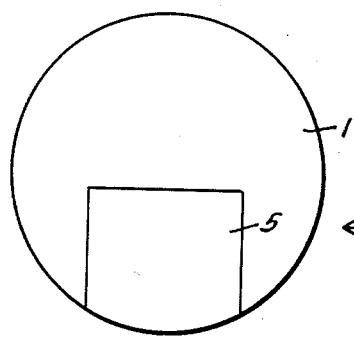
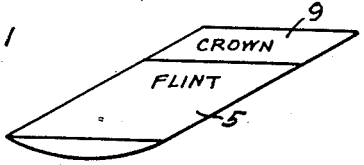
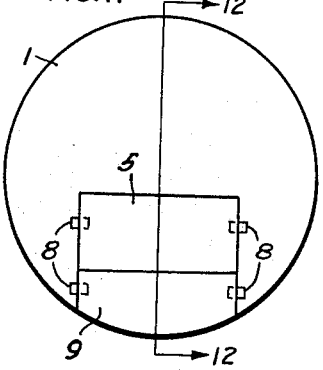
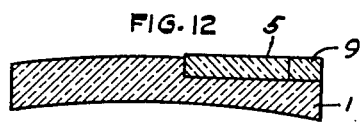
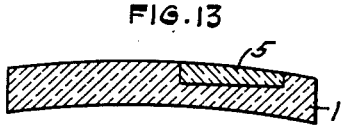
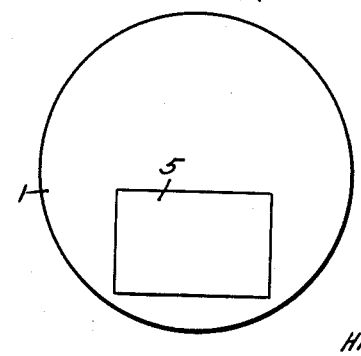
INVENTOR
HARRY A. TOULMIN, JR.
BY Toulmin & Toulmin
ATTORNEYS Patented Mar. 6, 1934

1,949,699

UNITED STATES PATENT OFFICE 1,949,699

BIFOCAL LENS

Harry A. Toulmin, Jr., Dayton, Ohio, assignor to The Univis Corporation, Dayton, Ohio, a corporation of Delaware Application July 13, 1931, Serial No. 550,415

7 Claims. (Cl. 88—54)

My invention relates to bifocal eyeglass lenses.

It is the object of my invention to provide a bifocal eyeglass lens having a flat top, straight side walls of the near vision insert, and, in some instances, a flat bottom, whereby optical displacement is prevented when the vision passes to the near vision portion of the lens from the distance vision portion of the lens, or vice versa.

It is a further object of my invention to provide a cheap method of grinding the countersink in the major lens and of inserting a cheaply formed, easily manufactured insert of either flint or a combination of flint and crown glass.

Heretofore in the art, it has been customary to grind a circular depression with a semi-circular bottom in the face of the major lens. This requires great accuracy in grinding and the corresponding insert that is fused in such a depression must have a corresponding curvature which likewise requires great skill and care in grinding.

According to my invention, I provide a recess portion in the face of the major lens which may be milled therefrom cheaply and accurately.

I insert in this depression from one end thereof a plate of glass constituting an insert, the back of which is arcuate of the same curvature as the bottom of the portion ground away in the major lens. The top of this depression is flat and the end of the insert is flat thereby providing an accurate pair of abutting faces, one or both of which can be greyed. This insert material may be produced in long bars and cut off at intervals as desired. If it is desired to provide space beneath the insert through which distance vision can be had, then this bar may be formed of alternate sections of flint and crown glass.

The exact configuration of the insert in the resulting eyeglass is determined by the degree of grinding. The arcuate sides may be provided by this grinding with a flat top and, in some instances, a flat bottom of the insert.

Referring to the drawing:

Figure 1 is a plan view of the raw glass major lens;

Figure 2 is a plan view thereof with the counter sink ground therein;

Figure 3 is an elevation looking at the lens from the bottom thereof;

Figure 4 is a plan view of the major lens with the insert placed in position upon the feelers;

Figure 5 is an end elevation thereof;

Figure 6 is a perspective of the flint insert;

Figure 7 is a section on the line 7—7 of Figure 4 prior to surface grinding of the blank;

Figure 8 is a similar view showing the blank ground;

Figure 9 is a plan view of the ground blank;

Figure 10 is a perspective of the insert formed of flint and crown glass;

Figure 11 is a plan view of the distance lens and insert with the feelers prior to fusing when using the insert of Figure 10;

Figure 12 is a section on the line 12—12 of Figure 11 prior to grinding the blank;

Figure 13 is a similar section showing the ground blank;

Figure 14 is a plan view of the ground blank.

Referring to the drawing in detail, 1 is a distance lens portion of crown glass having a cut away portion with an arcuate bottom edge 2, straight side edges 3, and a flat top edge 4. The insert comprising the insert bar of flint glass 5 has an arcuate back 6 and flat ends 7 which are preferably greyed. This end 7 abuts against the end 4 of the depression 2. Feelers of zinc or similar material, which will fuse into the glass, are located as at 8 at spaced intervals to support the insert in position while it is being fused. When united by such fusion to the distance lens portion, the insert is made of glass having substantially the same coefficient of expansion as the distance lens portion, so that no strain will be set up as the united portions contract while cooling after the fusing operation.

After fusing, the surface of the blank is ground from the form shown in Figure 7 to the form shown in Figure 8.

If the resulting lens is to have a distance vision portion beneath the insert, then the insert block 5 has, at intervals, sections of crown glass 9. The result is shown in Figures 12, 13 and 14.

It will be understood that when I refer to "crown" and "flint" glass I comprehend within my invention any types of glass suitable for distance and near vision purposes. For instance, barium crown glass may be substituted for flint glass.

It is also apparent that it is within the scope of my invention to provide any configuration of milled slot in the face of the major lens where such milling takes place from one margin towards the center of the lens so that an insert can be fed into the slot and the upper edge of the insert and the adjoining edge of the slot will be adjacent flat surfaces. It is further apparent that this slot may be given any desired curvature as may be necessary to create any reading addition which might be called for by a prescription, upon any suitable base curve.

It will be understood that I desire to comprehend within my invention such modifications as may be necessary to adapt it to varying conditions and uses.

Having thus fully described my invention, what I claim as new and desire to secure by Letters Patent, is:

1. In a bifocal eyeglass lens, a new article of manufacture for use as a distance lens comprising a glass body having a countersink in the face thereof extending from the margin thereof towards the center, said countersink having parallel margins and uniformly increasing in depth from the margins, and the inner wall of said countersink being at right angles thereto presenting a flat face.

2. In a bifocal eyeglass lens, a new article of manufacture for use as a major distance vision lens therefor comprising a glass body having a countersink in the face thereof extending from the periphery towards the center with an arcuate bottom and an inner straight end wall arranged in a vertical plane with respect to the face of the glass in which the slot has been cut.

3. In a bifocal eyeglass lens, a new article of manufacture for use as an insert therein comprising a bar having a flat face, an arcuate back and parallel side edges, and an end wall formed in a plane at right angles to the side edges, said insert being composed of alternate sections of distance and near vision glass.

4. In a bifocal eyeglass lens, a new article of manufacture for use as such a lens comprising a distance lens having a slot cut therein extending from the periphery towards the center of the lens, said slot having straight side edges, a straight top edge and an arcuate bottom edge, and an insert of similar configuration for near vision purposes mounted therein, said insert having a different index of refraction from said distance lens.

5. In a bifocal eyeglass lens, a new article of manufacture for use as such a lens comprising a distance lens having a slot cut therein extending from the periphery towards the center of the lens with straight side edges, a straight inner wall and an arcuate bottom, and an insert of similar configuration for near vision purposes mounted therein, the lower portion of said insert being formed of distance vision glass.

6. In a bifocal eyeglass lens, a slotted major lens for distance vision purposes and an insert for near vision purposes in said slot comprising an arcuate bottom edge, a flat top edge and straight parallel side edges, said insert having a different index of refraction from said major lens.

7. In a bifocal eyeglass lens, a major lens for distance vision purposes and an insert for near vision purposes comprising an arcuate bottom edge, a flat top edge, straight parallel side edges and an arcuate back, said insert having a different index of refraction but substantially the same coefficient of expansion with respect to said major lens.

HARRY A. TOULMIN, Jr.